Patented July 14, 1942

2,289,375

UNITED STATES PATENT OFFICE 2,289,375

CATALYTIC REFORMING

William J. Mattox, Chicago, Ill., assignor to Universal Oil Products Company, Chicago, Ill., a corporation of Delaware No Drawing. Application April 19, 1941,
Serial No. 389,450

9 Claims. (Cl. 196—50)

This invention relates to a process for reforming naphthas and other gasoline fractions, particularly those relatively high in olefins such as may be formed by a thermal cracking process. More particularly, this invention is related to the use of certain catalysts which have been shown to be particularly effective in increasing the octane number of the aforesaid charging stocks with a minimum of side reactions leading to the formation of normally gaseous products.

The catalysts of my invention comprise the fluorides of such elements as aluminum and magnesium which have a sufficiently high melting point and low volatility to withstand the temperatures to which they are subjected during the conversion and regeneration steps of the process. The reforming of olefinic gasolines is associated with deposition of carbonaceous material and it is a requisite of these catalysts that they be stable not only at the temperatures required for the conversion process but also at the temperatures to which a contact mass is subjected during the regeneration step. The common method used in regenerating the catalyst which has been used for conversions in which carbonaceous material is deposited on the catalyst, is to remove said carbonaceous material by oxidizing with gases containing a controlled quantity of oxygen. The temperature used during this regeneration process is at least equal to that used in the conversion step and in most cases somewhat higher in order to permit regeneration in a minimum of time.

The fluorides of certain metals which readily undergo change in valence when subjected to alternate oxidizing and reducing atmospheres, are not suitable in the process of catalytic reforming of olefinic hydrocarbons. The fluoride of such elements as, for example, those of nickel, iron, and cobalt promote side reactions which cause a formation of carbonaceous deposits as well as light gaseous hydrocarbons. The elements in the right hand column of group II of the periodic table in general form fluorides which are effective in the catalytic reforming of olefinic hydrocarbons. The fluorides of beryllium, magnesium, zinc, and cadmium may be used although they are not to be considered as equally effective and it is not my intention to place these catalysts on an equivalent basis. The fluorides of mercury are not satisfactory owing in part to their instability during regeneration and conversions. The metals of group III form fluorides which are in general satisfactory catalysts, aluminum fluoride being particularly effective. The fluorides of the elements which form strong bases such as those of sodium and the other alkali metals as well as those of the alkaline earth metals do not show the desired catalytic activity.

In one specific embodiment, the present invention comprises a process for the reforming of olefinic gasolines by subjecting them, at elevated temperatures of the order of 800–1100° F. and at pressures ranging from atmospheric to moderately atmospheric and for times of contact which correspond to a space velocity of 3 to 90 volumes of liquid charging stock per hour per unit volume of the catalyst when operating at a temperature of 950° F., to contact with a catalyst which comprises as one of its essential constituents the fluoride of a metal which has a constant valence during the conversion and regeneration cycle of the process, said metal being further characterized in that it forms a hydroxide which is a weak base.

The preferred pressure in the present invention is one which is sufficiently superatmospheric so as to force the charging stock through the catalyst bed and into the separating system without the use of vacuum apparatus. As the pressure is increased, the amount of polymerization as well as carbon formation is considerably increased. At the higher temperatures, pressures as high as 100 pounds per square inch may be used although pressures of 5 to 10 pounds per square inch gauge are preferable. The space velocity used depends upon the temperature and as the temperature drops below 900° F. the space velocity must be decreased to a point where the quantity of catalyst required becomes quite large and the process becomes less attractive when considered from the commercial viewpoint. A space velocity as high as 90 to 100 volumes of liquid charging stock per hour per unit volume of catalyst may be used when operating at a temperature above 1000° F. As increasingly high temperatures are used, the amount of gas formation increases and at temperatures above 1100° F. the liquid volume loss associated with the definite increase in octane number becomes undesirably high and is not compensated by the decreased size of the reactor necessary at such a temperature.

In practicing the process of my invention, the catalyst prepared according to the methods herein described, is used as a filler in the reaction tube or chamber in the form of particles of graded size or small pellets and the gasoline fraction heated to a temperature within the range of 800–1100° F. is passed through said catalyst at the space velocities hereinbefore set forth.

Owing to the relatively small amount of heat being absorbed or liberated in the reaction, adiabatic reactors are preferred because of their simplicity and reduced cost of construction. The reformed products are then quenched and subjected to a stabilizing operation in order to prepare a motor fuel of the desired volatility.

The amount of carbon formed during the reforming process is comparatively small and is usually of the order of $\frac{1}{10}$ percent by weight of the charging stock or less. The process periods used in the laboratory were commonly six hours in length and in a number of cases, twenty-four hour runs having been made. In commercial operation twelve or twenty-four hour process periods may readily be used, two reactors being contemplated, one being used in the process while the catalyst in the other is being regenerated. The temperatures used during the regeneration process with the fluoride containing catalyst is in general a little lower than would be used with pure alumina or with a blend of silica and alumina. Owing to the fact that the carbon deposition is relatively small, regeneration temperatures that are no higher than the process temperatures are contemplated. Temperatures up to 1100° F. have been successfully used although in operating with two reactors, it is readily possible to remove the carbon with a regeneration temperature of about 1050° F. and in some cases around 1000° F.

The reactions taking place in the reforming of olefinic gasolines by the catalysts comprised within the scope of my invention are not thoroughly understood. In the thermal cracking of higher boiling hydrocarbons to form gasoline some of the double bonds present in the olefinic molecules are probably not in the most stable position and at the high temperature used in the reforming process, a shift in the position in these double bonds undoubtedly takes place. It is assumed that the double bonds are more centrally located as a result of the contact action and this may be, in part, responsible for the higher octane number. In addition to the shift in double bond, a certain amount of branching undoubtedly takes place resulting in the formation of iso-olefins from those of normal structure. The amount of cracking taking place in the reforming process promoted by the catalyst of this present invention is comparatively small. The amount of liquid volume loss associated with the reforming of a complete boiling range of gasoline is usually less than 5 percent. The amount of polymerization when operating at pressures only mildly superatmospheric is so small that in some cases it is not necessary to redistill the product to remove the heavy bottoms. In some cases, particularly when the pressure is increased to the upper limits of 50 to 100 pounds per square inch, the amount of polymer formed is sufficiently great that it may be advisable or necessary to redistill the product. It has also been observed in some cases that a catalyst not completely regenerated is more desirable than one that has been completely freed from carbonaceous deposits. In some cases it may also be desired to prefractionate the charging stock and process only the higher boiling portion. In this case the full boiling range gasoline may be fractionated into two fractions, the lower boiling portion and a higher boiling portion, the latter for example, having an initial boiling point of about 200° F. When operating with such a gasoline fraction it may in some cases be found desirable to increase the severity of operating conditions so as to promote mild cracking and the formation of light ends. All such variations in the operating conditions are comprised within the scope of my invention.

It has been found that composite catalysts of the fluorides of the hereinbefore mentioned elements with certain hydrous oxides, form highly effective catalysts. It has been noted in particular that the chemically precipitated and purified hydrous oxides or hydrogels of such elements as silicon, aluminum, zirconium, and thorium are particularly effective. It has also been found that not all the hydrous oxides are satisfactory in the formation of these composite catalysts. The hydrous oxides of such elements as vanadium, chromium, iron, and nickel and in general the hydrous oxides of those elements which undergo a valence change during the conversion and regeneration cycle of the process are not considered satisfactory. The presence of compounds of the elements of variable valence results in the formation of excessive quantities of carbon and normally gaseous products.

*Example I*

Granules of anhydrous aluminum fluoride ($AlF_3$) of average diameter of $\frac{3}{16}$ inch were placed in a furnace and heated to a temperature of 975° F. A sample of 400° F. end point gasoline obtained by thermally cracking a Pennsylvania gas oil under conditions so as to yield a product having an octane number of 66.3 by the A. S. T. M. method and a bromine number of 87, was used as a charging stock. When passed over the catalyst at atmospheric pressure and at a space velocity of 20 volumes of liquid charging stock per hour per unit volume of catalyst, a 96.5 volume percent liquid recovery may be obtained, said product having an octane number of 74.5 A. S. T. M. motor method.

*Example II*

Aluminum fluoride hydrate may be ground with a chemically precipitated and washed silica hydrogel and the mixture formed into granules having an average diameter of $\frac{1}{8}$ to $\frac{3}{16}$ inch. The granules after being heated for several hours at 350° F. may then be slowly heated to a temperature of 950° F. and calcined at this higher temperature for one hour. Using proportions of aluminum fluoride in the calcined composite equal to 25 percent by weight and using the same charging stock as in Example I, a 97.6 volume percent liquid recovery product having an octane number of 75.2 A. S. T. M. motor method may be obtained when operating at a catalyst temperature of 950° F., a pressure of one atmosphere, and a liquid hourly space velocity of 15.1 volumes of charging stock per unit volume of catalyst.

*Example III*

Using the same charging stock as in the previous two examples and a catalyst consisting of granules of magnesium fluoride, a 97.2 volume percent liquid recovery product having an octane number of 73.5 can be obtained when operating at a catalyst temperature of 950° F. and a liquid hourly space velocity of 15 volumes of charging stock per unit volume of catalyst.

*Example IV*

A thermally cracked gasoline having an octane number of 61.2 A. S. T. M. motor method and having been obtained by processing a Texas gas oil, was used as the charging stock in this example. The catalyst used was an alumina prepared by precipitating aluminum hydroxide from a solution of aluminum sulfate by ammonium hydroxide. The precipitate was washed free of sulfate ions and then dried to constant weight at 400° C. The mass was then screened to separate particles of 10 to 30 mesh size. It was then heated to a temperature of 950° F. and used to process the aforesaid charging stock. When using a pressure of one atmosphere, a liquid hourly space velocity of 10, a 99.5 volume percent liquid recovery of gasoline having an octane number of 68.3 A. S. T. M. was obtained.

Example V

The catalyst used in this example may be prepared by mixing a portion of the washed alumina hydrogel from the previous example with magnesium fluoride in such quantity as to form a product containing 15 percent by weight $MgF_2$. After drying for six hours at 300° C. and then screening to separate particles of 10 to 30 mesh size the catalyst may then be heated to a temperature of 950° F. and used to process the gasoline of the preceding example. Using a liquid hourly space velocity of 10 and a pressure of one atmosphere, a 98.5 volume percent liquid recovery of a product having an octane number of 69.2 may be obtained.

Example VI

The catalyst is prepared by incorporating a washed silica hydrogel with aluminum fluoride and magnesium fluoride followed by drying at 300° C. The dried composite is then pulverized and screened to separate particles of 10 to 30 mesh size. The dried composite may contain $SiO_2$, $AlF_3$, and $MgF_2$ in the weight ratio of 74.5, 14.5, and 11 percent respectively. The granules after being heated to a temperature of 950° F. and used to process the same gasoline samples used in Examples IV and V. A 97.4 volume percent liquid recovery is obtainable, the product having an A. S. T. M. octane number of 69.8. The amount of carbon formed was equal to .057 by weight of the charge.

Example VII

A composite catalyst may be prepared by incorporating a blend of chemically precipitated and purified silica-alumina, having a ratio of 95 parts of silica to 5 parts of alumina by weight. This composite is then mixed in the undried condition with magnesium fluoride in the ratio of 80 parts by weight of silica-alumina blend and 20 parts by weight of magnesium fluoride. This mixture was then dried and screened to separate particles of 10 to 30 mesh size. These particles are then heated to a temperature of 950° F. and used to process the gasolines of Examples V and VI. Using a liquid hourly space velocity of 10 and a pressure of one atmosphere, 98.2 volume percent liquid recovery of a product having an octane number of 69.5 may be obtained.

I claim as my invention:

1. A process of reforming an olefinic gasoline which comprises subjecting said gasoline under olefin isomerizing conditions to the action of a catalyst composite comprising as an essential constituent the fluoride of a metal which has a constant valence during said conversion process and in regeneration treatment thereof, said metal being further characterized in that it forms a hydroxide which is a weak base.

2. A process of reforming an olefinic gasoline which comprises subjecting said gasoline at a temperature within the approximate limits of 800 to 1100° F. and at a pressure within the approximate limits of atmospheric to about 100 pounds per square inch to the action of a catalyst composite comprising as an essential constituent, the fluoride of a metal which has a constant valence during said conversion process and in regeneration treatment thereof, said metal being further characterized in that it forms a hydroxide which is a weak base.

3. A process for the reforming of an olefinic gasoline which comprises subjecting said gasoline at a temperature within the approximate limits of 800 to 1100° F. and for a time of contact-temperature relationship equivalent to a liquid hourly space velocity of 3 to 90 volumes of charge per unit volume of catalyst at a temperature of 950° F., to contact with a catalyst comprising as an essential constituent the fluoride of a metal which has a constant valence during said conversion process and in regeneration treatment thereof, said metal being further characterized in that it forms a hydroxide which is a weak base.

4. A process for the reforming of an olefinic gasoline which comprises subjecting said gasoline to contact with aluminum fluoride at a temperature within the approximate limits of 800 to 1100° F. and at a pressure within the approximate limits of atmospheric to about 100 pounds per square inch and for a time of contact adequate to substantially increase the octane number thereof.

5. A process for reforming an olefinic gasoline which comprises subjecting said gasoline to contact with a catalyst composite comprising magnesium fluoride as an essential constituent thereof at a temperature within the approximate limits of 800 to 1100° F. and at a pressure within the approximate limits of atmospheric to about 100 pounds per square inch and for a time of contact adequate to substantially increase the octane number thereof.

6. A process for reforming an olefinic gasoline which comprises subjecting said gasoline at a temperature within the approximate limits of 800 to 1100° F. and at a pressure within the approximate limits of atmospheric to about 100 pounds per square inch to the action of a catalyst composite comprising the fluoride of a metal which has a constant valence during said conversion process and in regeneration treatment thereof, said metal being further characterized in that it forms a hydroxide which is a weak base, and the calcined hydrous oxide of an element which is also characterized in that it has a constant valence during the conversion process and in regeneration treatment thereof.

7. A process for the reforming of an olefinic gasoline which comprises subjecting said gasoline at a temperature within the approximate limits of 800 to 1100° F. and at a pressure within the approximate limits of atmospheric to about 100 pounds per square inch, to the action of a composite catalyst comprising the fluoride of a metal which has a constant valence during said conversion process and in regeneration treatment thereof, said metal being further characterized in that it forms a hydroxide which is a weak base, and a calcined silica hydrogel which has been substantially freed of alkali metal ions during its preparation.

8. A process for the reforming of an olefinic gasoline which comprises subjecting said gasoline at a temperature within the approximate limits of 800 to 1100° F. and at a pressure within the approximate limits of atmospheric to about 100 pounds per square inch, to the action of a composite catalyst comprising the fluoride of a metal which has a constant valence during said conversion process and in the regeneration treatment thereof, said metal being further characterized in that it forms a hydroxide which is a weak base, and a calcined blend of the hydrates of alumina and silica, said blend having been substantially freed of alkaline metal ions during its preparation.

9. A process for the reforming of an olefinic gasoline which comprises subjecting said gasoline at a temperature within the approximate limits of 800 to 1100° F. and at a pressure of from about atmospheric to moderately superatmospheric to contact with a catalyst composite comprising as an essential constituent a fluoride of a metal which has a constant valence during said conversion process and in regeneration treatment thereof, said metal being further characterized in that it forms a hydroxide which is a weak base, the time of contact being sufficient to substantially increase the octane number of said gasoline and to maintain a liquid volume loss due to the gasification below about 5 per cent.

WILLIAM J. MATTOX.